US011599467B2

United States Patent
Jalal et al.

(10) Patent No.: US 11,599,467 B2
(45) Date of Patent: Mar. 7, 2023

(54) CACHE FOR STORING COHERENT AND NON-COHERENT DATA

(71) Applicant: Arm Limited, Cambridge (GB)

(72) Inventors: Jamshed Jalal, Austin, TX (US); Bruce James Mathewson, Papworth Everard (GB); Tushar P Ringe, Austin, TX (US); Sean James Salisbury, Appley Bridge (GB); Antony John Harris, Hathersage (GB)

(73) Assignee: Arm Limited, Cambridge (GB)

( * ) Notice: Subject to any disclaimer, the term of this patent is extended or adjusted under 35 U.S.C. 154(b) by 37 days.

(21) Appl. No.: 17/331,806

(22) Filed: May 27, 2021

(65) Prior Publication Data

US 2022/0382679 A1    Dec. 1, 2022

(51) Int. Cl.
  *G06F 12/08* (2016.01)
  *G06F 12/0815* (2016.01)
  *G06F 12/0895* (2016.01)

(52) U.S. Cl.
  CPC ...... *G06F 12/0815* (2013.01); *G06F 12/0895* (2013.01); *G06F 2212/608* (2013.01)

(58) Field of Classification Search
  None
  See application file for complete search history.

(56) References Cited

U.S. PATENT DOCUMENTS

| 2008/0086602 | A1* | 4/2008 | Guthrie | G06F 12/0817 |
| | | | | 711/144 |
| 2009/0083493 | A1* | 3/2009 | Kinter | G06F 12/0831 |
| | | | | 711/141 |
| 2013/0173894 | A1* | 7/2013 | Yan | G06F 12/1072 |
| | | | | 712/228 |
| 2013/0318308 | A1  | 11/2013 | Jayasimha et al. | |
| 2013/0326153 | A1* | 12/2013 | Rozas | G06F 12/0862 |
| | | | | 711/141 |
| 2018/0004663 | A1* | 1/2018 | Jalal | G06F 12/0811 |
| 2018/0157590 | A1  | 6/2018 | Persson et al. | |
| 2020/0097407 | A1* | 3/2020 | Kimelman | G06F 13/4027 |

* cited by examiner

*Primary Examiner* — Tracy C Chan
(74) *Attorney, Agent, or Firm* — Leveque Intellectual Property Law, P.C.

(57) ABSTRACT

The present disclosure advantageously provides a system cache and a method for storing coherent data and non-coherent data in a system cache. A transaction is received from a source in a system, the transaction including at least a memory address, the source having a location in a coherent domain or a non-coherent domain of the system, the coherent domain including shareable data and the non-coherent domain including non-shareable data. Whether the memory address is stored in a cache line is determined, and, when the memory address is not determined to be stored in a cache line, a cache line is allocated to the transaction including setting a state bit of the allocated cache line based on the source location to indicate whether shareable or non-shareable data is stored in the allocated cache line, and the transaction is processed.

22 Claims, 11 Drawing Sheets

"Permitted Cache State Transitions" Table

| Current state / Next state | Invalid | NshC | NshD | ShC | ShD |
|---|---|---|---|---|---|
| Invalid | | Prefetch[b] | | | |
| NshC | Eviction | | | | |
| NshD | Eviction[a] | Clean[a] | | | |
| ShC | Eviction | | | | |
| ShD | Eviction[a] | Sh to Nsh and Clean[a] | Sh to Nsh | Clean[a] | |

[a] Line is written to memory
[b] Line is fetched from memory
NshC  Non-Sharable Clean
NshD  Non-Sharable Dirty
ShC   Sharable Clean
ShD   Sharable Dirty

"Expected and Permitted State Changes" Table

| Ingress transaction | Current state | Next state (E is expected, P is permitted, - is not permitted) | | | | | Note |
|---|---|---|---|---|---|---|---|
| | | Invalid | NshC | NshD | ShC | ShD | |
| ReadNoSnoop | Invalid | E | E | - | - | - | Miss and needs memory fetch which might be allocated |
| | NshC | P | E | - | - | - | Read might be allocated upstream |
| | NshD | P* | P* | E | - | - | |
| | ShC | P | E | - | - | - | Read must miss and fetch from memory. Best to allocate as Nsh to be visible to all |
| | ShD | P* | P* | E | - | - | Non-shareable read converts ShD line to Nsh |
| ReadClean | Invalid | E | P | - | P | - | Miss, memory fetch can be allocated as Sh or NSh |
| | NshC | E | P | - | - | - | Data likely to be allocated upstream |
| | NshD | E* | P* | E | - | - | Cache is expected to either deallocate and write to memory or keep line allocated to avoid a write-back. |
| | ShC | E | - | - | P | - | Cache likely to deallocate as line should be allocated upstream |
| | ShD | E* | P* | P | P* | E | ShD is always permitted to move to Nsh or Clean state |
| ReadShared | Invalid | E | P | - | P | - | Miss, memory fetch can be allocated as Sh or NSh |
| | NshC | E | P | - | - | - | Data likely to be allocated upstream |
| | NshD | E* | P* | E | - | - | Cache might deallocate as line should be allocated upstream |
| | ShC | E | - | - | P | - | Cache likely to deallocate as line should be allocated upstream |
| | ShD | E | P* | P | P | P | If OKAYDIRTY response is given, the line must not stay in a Dirty state. |

* Existing line is written to memory

FIG. 5B

410 → "Expected and Permitted State Changes" Table

| Transaction | Current | Invalid | NshC | NshD | ShC | ShD | Note |
|---|---|---|---|---|---|---|---|
| ReadOnce | Invalid | E | P | - | E | - | Miss, memory fetch can be allocated as Sh or NSh |
| | NshC | P | E | - | - | - | Read will not be allocated upstream |
| | NshD | P* | P* | E | - | - | |
| | ShC | P | - | - | E | - | |
| | ShD | P* | P* | P | P* | E | |
| ROCI | Invalid | E | P | - | P | - | Miss, memory fetch recommended not to be allocated |
| | NshC | E | P | - | - | - | Cache is permitted but not expected to keep the line |
| | NshD | E* | P* | P | - | - | |
| | ShC | E | - | - | P | - | |
| | ShD | E* | P* | P | P* | P | |
| ROMI | Invalid | E | P | - | P | - | Miss, memory fetch recommended not to be allocated |
| | NshC | E | P | - | - | - | Cache is permitted but not expected to keep the line |
| | NshD | E | P | P | - | - | Write to memory not required |
| | ShC | E | P | - | P | - | |
| | ShD | E | P | P | P | P | |
| CleanShared* | Invalid | E | - | - | - | - | Cache miss |
| | NshC | P | E | - | - | - | Line must be cleaned |
| | NshD | P* | E* | - | - | - | |
| | ShC | P | - | - | E | - | |
| | ShD | P* | P* | - | E* | - | |
| CleanInvalid | Invalid | E | - | - | - | - | Cache miss |
| | NshC | E | - | - | - | - | Line must be cleaned and invalidated |
| | NshD | E* | - | - | - | - | |
| | ShC | E | - | - | - | - | |
| | ShD | E* | - | - | - | - | |
| MakeInvalid | Invalid | E | - | - | - | - | Cache miss |
| | NshC | E | - | - | - | - | Line must be invalidated, clean not necessary |
| | NshD | E | - | - | - | - | |
| | ShC | E | - | - | - | - | |
| | ShD | E | - | - | - | - | |

* Existing line is written to memory
* Also CleanSharedPersist, CleanSharedDeepPersist

"Expected and Permitted State Changes" Table

| Transaction | Current | Invalid | NshC | NshD | ShC | ShD | Note |
|---|---|---|---|---|---|---|---|
| WriteNoSnoop | Invalid | E[b] | - | - | - | - | Misses in cache, partial line so won't be allocated |
| | NshC | P[b] | P[b] | E | - | - | |
| | NshD | P[a,b] | P[a,b] | E | - | - | |
| | ShC | E[b] | - | - | - | - | Write must not hit ShC line. ShC line must be invalidated |
| | ShD | P[a,b] | P[a,b] | E | - | - | Data can be merged with existing line, but must move to Nsh |
| WriteNoSnoopFull WriteZero (NSH) | Invalid | P[b] | P[b] | E | - | - | Cache miss, line can be allocated |
| | NshC | P[b] | P[b] | E | - | - | Write expected to replace existing line |
| | NshD | P[b] | P[b] | E | - | - | |
| | ShC | P[b] | P[b] | E | - | - | |
| | ShD | P[b] | P[b] | E | - | - | |
| WriteBackFull WriteZero (ISH, OSH) | Invalid | P[b] | P[b] | P | P[b] | E | Full line shareable write is expected to be allocated as ShD |
| | NshC | P[b] | P[b] | P | P[b] | E | |
| | NshD | P[b] | P[b] | E | P[a,b] | P[a] | Can move to ShD if line is written to memory before it is updated |
| | ShC | P[b] | P[b] | P | P[b] | E | ShC moves to ShD but ShD is also permitted to move to Nsh or Clean state |
| | ShD | P[b] | P[b] | P | P[b] | E | ShD is always permitted to move to Nsh or Clean state |
| WriteEvictFull | Invalid | P | - | - | E | - | Full line shareable clean eviction. If allocating, line must be ShC |
| | NshC | P | E | - | - | - | WriteEvictFull must miss and be discarded |
| | NshD | - | - | E | - | - | WriteEvictFull must miss and be discarded |
| | ShC | P | - | - | E | - | WriteEvictFull data should be the same as the cached data |
| | ShD | P[a] | P[a] | P | P[a] | E | WriteEvictFull data should be the same as the cached data |

[a] Existing line is written to memory
[b] New data is written to memory

FIG. 5D

410 — "Expected and Permitted State Changes" Table

| Transaction | Current | Invalid | NshC | NshD | ShC | ShD | Note |
|---|---|---|---|---|---|---|---|
| WritePtlCMO WriteFullCMO (CleanInvalid) | Invalid | E[b] | - | - | - | - | Partial line write which must result in invalidation |
| | NshC | E[b] | - | - | - | - | |
| | NshD | E[ab] | - | - | - | - | |
| | ShC | E[b] | - | - | - | - | |
| | ShD | E[ab] | - | - | - | - | |
| WritePtlCMO (NSH, CleanShared*) | Invalid | E[b] | - | - | - | - | |
| | NshC | P[b] | E[b] | - | - | - | |
| | NshD | P[ab] | E[ab] | - | - | - | Write can be merged with line before writing to memory |
| | ShC | E[b] | - | - | - | - | Non-shareable write must not hit ShC line. Line must be invalidated |
| | ShD | P[ab] | E[ab] | - | - | - | Write can be merged with existing line before writing to memory. If still allocated, line must move to NshC |
| WritePtlCMO (ISH, OSH, CleanShared*) | Invalid | E[b] | - | - | - | - | |
| | NshC | P[b] | E[b] | - | - | - | |
| | NshD | P[ab] | E[ab] | - | - | - | Write can be merged with line before writing to memory |
| | ShC | P[b] | P[b] | - | E[b] | - | |
| | ShD | P[ab] | P[ab] | - | E[ab] | - | Write can be merged with line before writing to memory |
| WriteFullCMO (NSH, CleanShared*) | Invalid | E[b] | - | - | - | - | |
| | NshC | P[b] | E[b] | - | - | - | |
| | NshD | P[b] | E[b] | - | - | - | |
| | ShC | E[b] | - | - | - | - | Non-shareable write must not hit ShC line. Line must be invalidated |
| | ShD | P[b] | E[b] | - | - | - | If still allocated, line must move to NshC |
| WriteFullCMO (ISH, OSH, CleanShared*) | Invalid | E[b] | - | - | - | - | |
| | NshC | P[b] | E[b] | - | - | - | |
| | NshD | P[ab] | E[ab] | - | - | - | |
| | ShC | P[b] | P[b] | - | E[b] | - | |
| | ShD | P[b] | P[b] | - | E[b] | - | |

[a] Existing line is written to memory
[b] New data is written to memory
* Also CleanSharedPersist, CleanSharedDeepPersist

FIG. 5E

CACHE FOR STORING COHERENT AND NON-COHERENT DATA

BACKGROUND

The present disclosure relates to a data processing system. More particularly, the present disclosure relates to a cache for a data processing system.

A data processing system may include a system-on-chip (SoC) with various components that are connected by one or more interconnects. Generally, certain components process data, such as, for example, processors, such as central processing units (CPUs) and CPU clusters, accelerators such as graphics processing units (GPUs) and GPU clusters, etc., while other components send data to, and receive data from, the data processing components, such as, for example, memory controllers, input/output (I/O) controllers, network interface controllers, etc. These data provisioning components may be connected to on-chip or off-chip memory, data buses, wired or wireless networks, etc. The interconnect provides the network infrastructure over which data transactions between components are conveyed. The data processing system may be divided into coherent domains and non-coherent domains.

A cache that stores coherent data resides within a coherent domain of the data processing system, and is coupled to (or resides within) a coherent interconnect. The coherent interconnect generates appropriate snoops and management transactions to maintain data coherency without additional software management by the various components or agents. Any agent that uses this cache must also reside within the coherent domain. A coherent cache does not store data from a non-coherent domain.

Similarly, a cache that stores non-coherent data resides within a non-coherent domain of the data processing system. Compared to a coherent cache, a non-coherent cache is typically located closer to the memory controllers, is larger and has a higher latency. Any agent that uses this cache must maintain data coherency with additional software management to ensure that dirty data is made visible to other agents within the non-coherent domain. A non-coherent cache does not store data from a coherent domain.

BRIEF DESCRIPTION OF THE DRAWINGS

FIG. 5A depicts the permitted cache state transitions table, in accordance with an embodiment of the present disclosure.

FIGS. 5B to 5E depict the expected and permitted state changes table, in accordance with embodiments of the present disclosure.

DETAILED DESCRIPTION

Figure 1A:
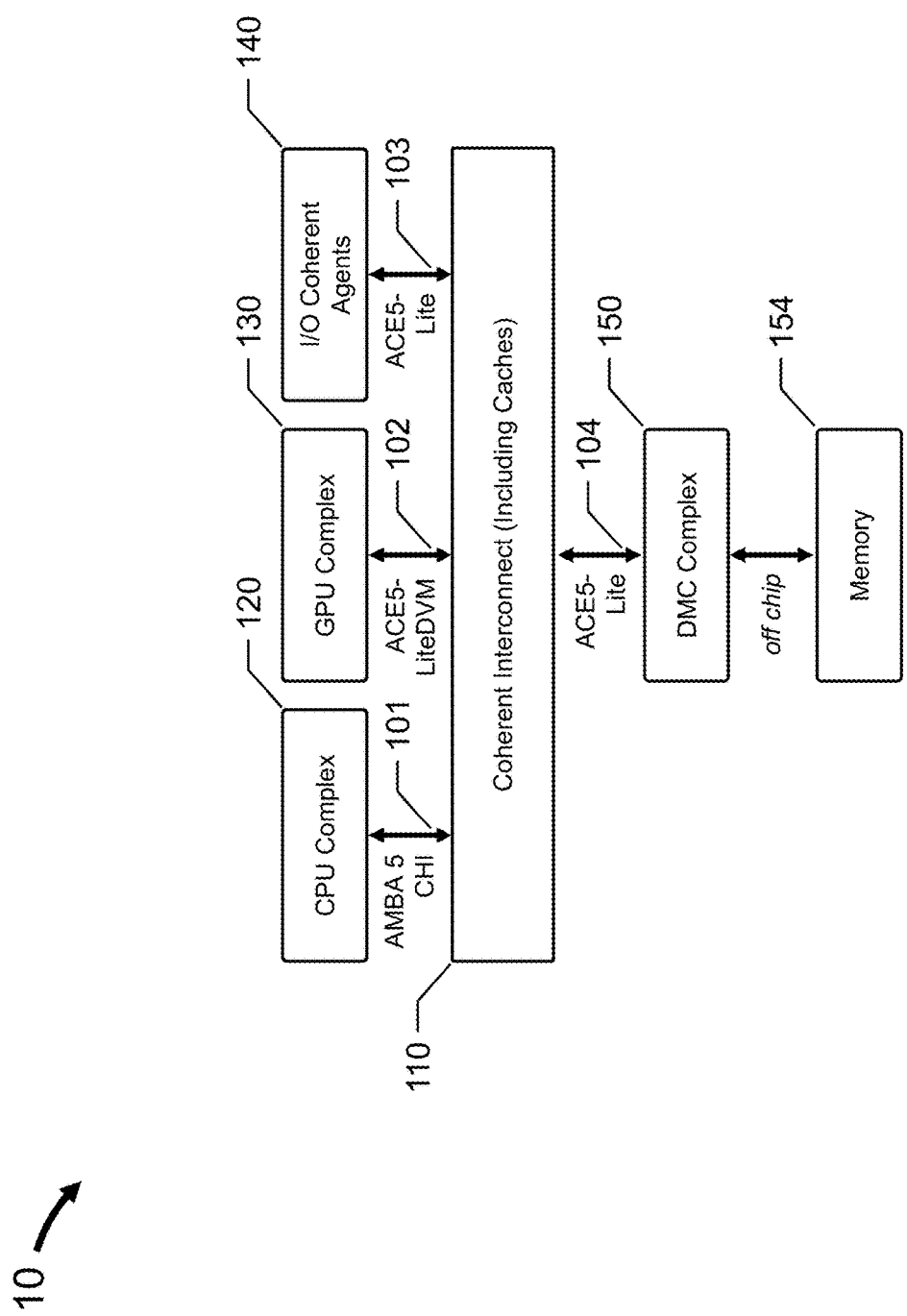
FIG. 1A depicts a block diagram for a system with a coherent domain, in accordance with an embodiment of the present disclosure.

Embodiments of the present disclosure will now be described with reference to the drawing figures, in which like reference numerals refer to like parts throughout.

Embodiments of the present disclosure advantageously provide a single cache that stores both coherent data and non-coherent data by tracking which cache lines store shareable data from the coherent domain and which cache lines store non-shareable data from the non-coherent domain. Cache lines are dynamically allocated as either shareable (i.e., coherent) or non-shareable (i.e., non-coherent), which advantageously enlarges the caching resource available to the coherent and non-coherent domains.

In addition to identifying and storing shareable and non-shareable data from the coherent and non-coherent domains, respectively, the cache advantageously functions as an eviction cache for the coherent domain by caching shareable clean evictions, and enables the migration of dirty shareable cache lines back into the coherent domain without writing the cache line data to memory. The cache is located closer to off-chip memory, to reduce average latencies compared with memory and reduce off-chip memory traffic, and away from the coherent domain, where area and latency are at a premium. Additionally, when the cache usage is modal with bursts of activity in each domain, the cache may be maximally occupied.

In one embodiment, a method for storing coherent data and non-coherent data in a system cache includes receiving a transaction from a source in a system, the transaction including at least a memory address, the source having a location in a coherent domain or a non-coherent domain of the system, the coherent domain including shareable data and the non-coherent domain including non-shareable data; determining whether the memory address is stored in a cache line; and, when the memory address is not determined to be stored in a cache line, allocating a cache line to the transaction including setting a state bit of the allocated cache line based on the source location to indicate whether shareable or non-shareable data is stored in the allocated cache line, and processing the transaction.

FIG. 1A depicts a block diagram for system 10 with a coherent domain, in accordance with an embodiment of the present disclosure.

System 10 includes coherent interconnect 110 coupled to one or more processors, such as CPU complex 120, one or more accelerators, such as GPU complex 130, one or more I/O Master or Manager devices, such as I/O coherent agents 140, and one or more dynamic memory controllers (DMCs), such as DMC complex 150. DMC complex 150 is coupled to memory 154. In this embodiment, CPU complex 120 is coupled to coherent interconnect 110 via AMBA 5 CHI connection 101, GPU complex 130 is coupled to coherent interconnect 110 via ACE5-LiteDVM connection 102, I/O coherent agents 140 are coupled to coherent interconnect 110 via ACE5-Lite connections 103, and DMC complex 150 is coupled to coherent interconnect 110 via ACE5-Lite connection 104; other connection protocols may also be used.

AMBA 5 CHI refers to the Arm Advanced Microcontroller Bus Architecture (AMBA) 5 Coherent Hub Interface (CHI) architecture, ACE5 refers to the Arm AMBA AXI Coherency Extension (ACE) 5 architecture, AXIS refers to the Arm Advanced eXtensible Interface (AXI) 5 architecture, and ACE5-LiteDVM refers to the Arm AMBA ACE5-Lite Distributed Virtual Memory (DVM) architecture.

Coherent interconnect 110 is a communication system that transfers data among CPU complex 120, GPU complex 130, I/O coherent agents 130, DMC complex 150 (and memory 154), as well as other components (not depicted). Coherent interconnect 110 employs a coherent bus protocol that ensures that all requesters, i.e., processors, accelerators, Manager devices, agents, etc., see the same view of memory. Certain components of system 10 may be classified as, associated with, or represented by, a particular type of interconnect protocol node, as discussed in more detail with respect to FIG. 1B. Coherent interconnect 110 may also include one or more system caches and snoop filters to store evicted or stashed data from requesters.

Generally, coherent interconnect 110 may include, inter alia, a shared or hierarchical bus, a crossbar switch, a packet-based serialized network-on-chip (NoC), etc. In one embodiment, coherent interconnect 110 has a crossbar topology that provides an ordered network with low latency, and may be particularly suitable for a small-sized interconnect with a small number of protocol nodes, switches and wire counts. In another embodiment, coherent interconnect 110 has a ring topology that balances wiring efficiency with latency, which increases linearly with the number of protocol nodes, and may be particularly suitable for a medium-sized interconnect. In a further embodiment, coherent interconnect 110 has a mesh topology that has more wires to provide greater bandwidth, is modular and easily scalable by adding more rows and columns of switches or routers, and may be particularly suitable for a large-sized interconnect.

In many embodiments, coherent interconnect 110 is a coherent mesh network that includes multiple switches or router logic modules (routers) arranged in a two-dimensional rectangular mesh topology, such as, for example, the Arm CoreLink Coherent Mesh Network CMN-700. In this example, the switches or routers are crosspoints (i.e., XPs). Each XP may connect up to four neighboring XPs using mesh ports, and may connect to one or two components (devices) using device ports. Additionally, each XP may support four CHI channels to transport data from a source device to a destination or target device.

In these embodiments, coherent interconnect 110 may have an architecture that includes three layers, i.e., an upper protocol layer, a middle network layer, and a lower link layer. The protocol layer generates and processes requests and responses at the protocol nodes, defines the permitted cache state transitions at the protocol nodes that include caches, defines the transaction flows for each request type, and manages the protocol level flow control. The network layer packetizes the protocol message, determines, and adds to the packet, the source and target node identifiers (IDs) required to route the packet over coherent interconnect 110 to the required destination. The link layer provides flow control between components, and manages link channels to provide deadlock free switching across coherent interconnect 110.

CPU complex 120 includes multiple CPUs arranged in a cluster. In many embodiments, each CPU includes multiple cores, each core includes one or two caches, and each CPU may include a cache that is shared by the cores, such as, for example the Arm Cortex A, R and M families of processors. Additionally, CPU complex 120 may include a local interconnect and a cache that is shared by the CPUs. Generally, the CPUs within CPU complex 120 execute computer programs or modules, such as an operating system, application software, other software modules, etc., stored within a memory, such as, for example, memory 154, to perform various functions for system 10, such as, for example, control, computation, input/output, etc. The CPUs of CPU complex 120 initiate data requests to coherent interconnect 110 via AMBA 5 CHI connection 101.

GPU complex 130 includes multiple GPUs arranged in a cluster. In many embodiments, each GPU includes multiple processors with multiple cores or multiple cores, each processor or core may include a cache, and each GPU may include a cache that is shared by the processor or cores, such as, for example the Arm Mali family of graphics processing units. Additionally, GPU complex 130 may include a local interconnect and a cache that is shared among the GPUs. Generally, the GPUs are optimized to perform one or more specific functions, such as graphics processing, images and/or multimedia data, process digital signal data, process artificial neural network data, etc. The GPUs of GPU complex 130 initiate data requests to coherent interconnect 110 via ACE5-LiteDVM connection 102.

I/O coherent agents 140 are I/O Manager devices that initiate data requests to coherent interconnect 110 via ACE5-Lite connections 103.

DMC complex 150 includes one or more DMCs arranged in a cluster, such as, for example, the Arm CoreLink Dynamic Memory Controller DMC-620. Each DMC includes a microprocessor, microcontroller, application-specific integrated circuit (ASIC), field-programmable gate array (FPGA), logic circuits, etc., and is configured to provide access to memory 154 through coherent interconnect 110. Memory 154 may include a variety of non-transitory computer-readable medium that may be accessed by the other components of system 10, such as CPU complex 120, GPU complex 130, I/O coherent agent 140, etc. For example, memory 154 may store data and instructions for execution by the CPUs of CPU complex 120, etc. The DMCs of DMC complex 150 receive data requests from coherent interconnect 110 via ACE5-Lite connection 104.

In various embodiments, memory 154 may include volatile and nonvolatile medium, non-removable medium and/or removable medium. For example, memory 154 may include any combination of random access memory (RAM), dynamic RAM (DRAM), double data rate (DDR) DRAM or synchronous DRAM (SDRAM), static RAM (SRAM), read only memory (ROM), flash memory, and/or any other type of non-transitory computer-readable medium. In many embodiments, the DMCs of DMC complex 150 provide data transfers to and from high-density DDR3 or DDR4 DRAM memory.

Figure 1B:
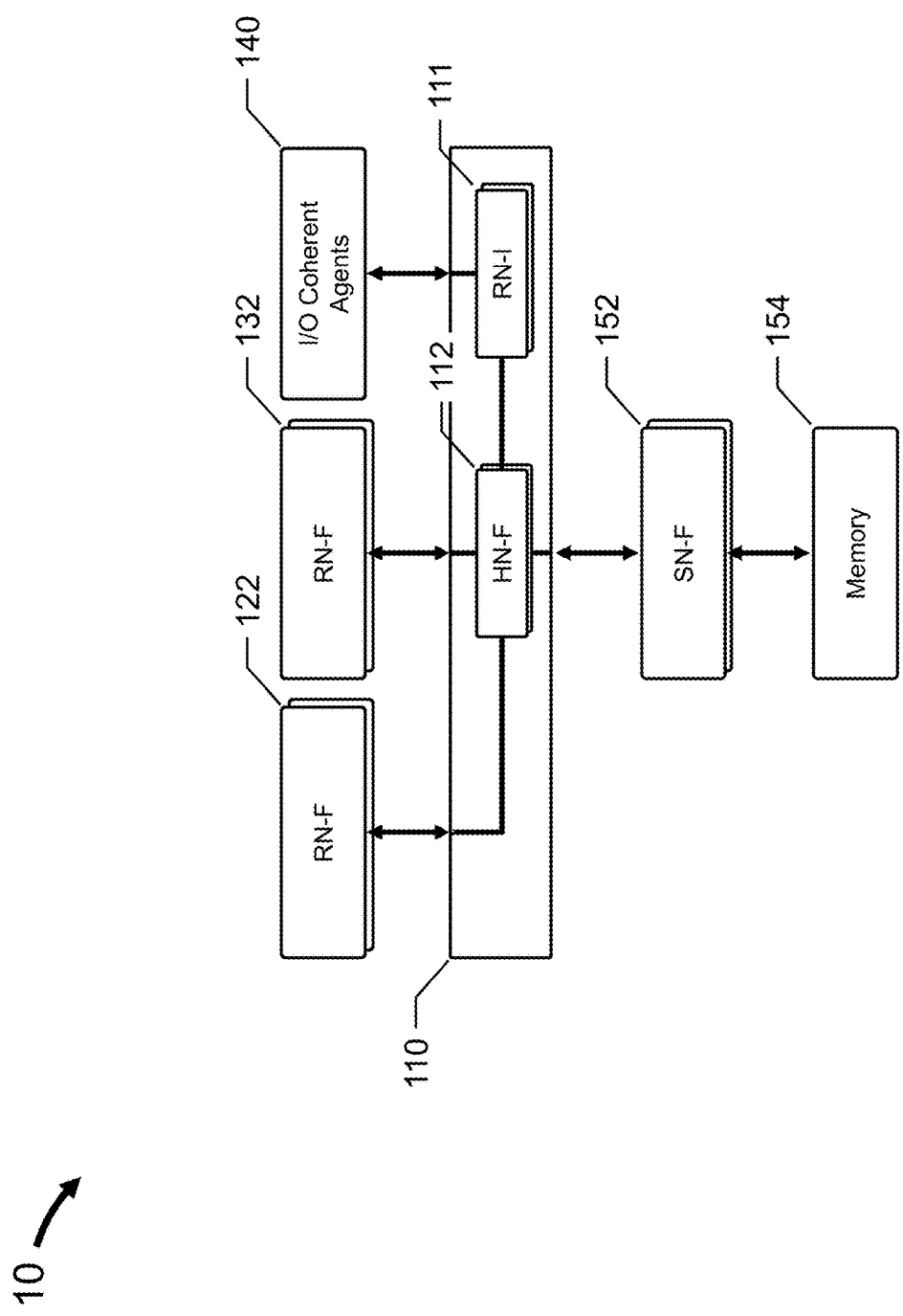
FIG. 1B depicts a block diagram for the system depicted in FIG. 1A using protocol node nomenclature, in accordance with an embodiment of the present disclosure.

FIG. 1B depicts a block diagram for system 10 using protocol node nomenclature, in accordance with an embodiment of the present disclosure.

A requester is represented by a Request Node (RN), which is a protocol node that generates protocol transactions for coherent interconnect 110, such as, for example, memory reads and writes, I/O data transfers, etc. An RN-F protocol node is a "fully" coherent requester, and an RN-I protocol node represents an "I/O" coherent requester. The CPUs of CPU complex 120 are fully coherent requesters, so RN-Fs 122 represent the CPUs of CPU complex 120. Similarly, the GPUs of GPU complex 130 are fully coherent requesters, so RN-Fs 132 represent the GPUs of GPU complex 130. Each RN-I is associated with an I/O coherent agent 140 that is connected to coherent interconnect 110, and includes a microprocessor, microcontroller, ASIC, FPGA, logic circuits, etc., to provide the relevant functionality. In some embodiments, RN-Is may use the same hardware. I/O coherent agents 140 are I/O coherent requesters, so RN-Is 111 are associated with I/O coherent agents 140.

In this embodiment, coherent interconnect 110 includes several completers, each including a microprocessor, microcontroller, ASIC, FPGA, logic circuits, etc., to provide the relevant functionality. Each completer is associated with a Home Node (HN), which is a protocol node that receives protocol transactions from RNs, and may receive protocol transactions from Slave or Subordinate Nodes (SNs), as described below. Similar to RNs, an HN-F protocol node represents a fully coherent completer, and an HN-I protocol node represents an I/O coherent completer.

In many embodiments, each HN-F 112 manages a portion of the address space for memory 154. Each HN-F may include a system level cache and a snoop traffic filter, and acts as the Point-of-Coherency (PoC) and Point of Serialization (PoS) for requests sent to that HN-F from RN-Fs and RN-Is. To avoid conflicts when multiple RNs attempt to access the same memory address within memory 154, HN-Fs 112 act as the PoS, processing read requests, write requests, etc., in a serial manner.

A fully coherent Slave or Subordinate device may be represented by an SN-F node, which is a protocol node that receives and completes requests from the HN-Fs. Memory controllers 150 are fully coherent Subordinate devices, so SN-Fs 152 represent memory controllers 150. In many embodiments, each HN-F 112 is associated with an SN-F 152, and each SN-F 152 is represented by one or more HN-Fs 112.

Figure 2:
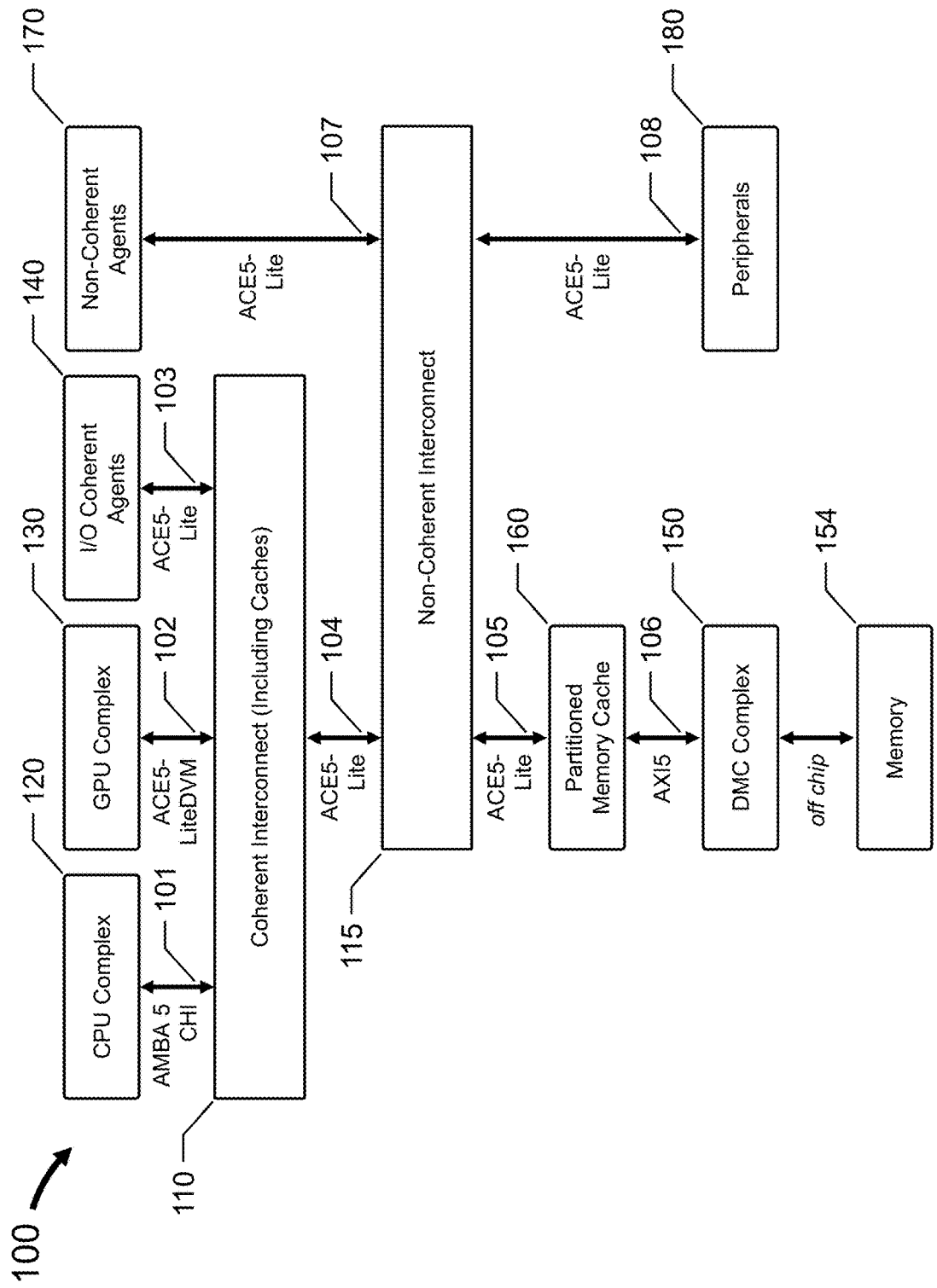
FIG. 2 depicts a block diagram for a system with coherent and non-coherent domains, in accordance with an embodiment of the present disclosure.

FIG. 2 depicts a block diagram for system 100 with a coherent domain and a non-coherent domain, in accordance with an embodiment of the present disclosure.

System 100 includes a coherent domain and a non-coherent domain. The coherent domain includes coherent interconnect 110, CPU complex 120, GPU complex 130, I/O coherent agents 140, partitioned memory cache 160, DMC complex 150 and memory 154. The non-coherent domain includes non-coherent interconnect 115, non-coherent agents 170 (i.e., Manager devices) and peripherals 180 (i.e., Subordinate devices), as well as partitioned memory cache 160, DMC complex 150 and memory 154. Several components provide service for, and reside within, both domains, i.e., partitioned memory cache 160, DMC complex 150 and memory 154. Each non-coherent agent 170 uses software management to ensure that dirty data is made visible to other agents within the non-coherent domain.

In this embodiment, CPU complex 120 is coupled to coherent interconnect 110 via AMBA 5 CHI connection 101, GPU complex 130 is coupled to coherent interconnect 110 via ACE5-LiteDVM connection 102, I/O coherent agents 140 are coupled to coherent interconnect 110 via ACE5-Lite connections 103, non-coherent agents 170 are coupled to non-coherent interconnect 115 via ACE5-Lite connections 107, coherent interconnect 110 is coupled to non-coherent interconnect 115 via ACE5-Lite connection 104, non-coherent interconnect 115 is coupled to partitioned memory cache 160 via ACE5-Lite connection 105, partitioned memory cache 160 is coupled to DMC complex 150 via AXIS connection 106; other connection protocols may also be used.

Non-coherent interconnect 115 is a communication system that transfers data among coherent interconnect 110 (i.e., CPU complex 120, GPU complex 130 and I/O coherent agents 140), non-coherent agents 170, DMC complex 150 (i.e., memory 154), and peripherals 180. In many embodiments, non-coherent interconnect 115 is a packetized network-on-chip (NoC), such as, for example, the Arm CoreLink Network Interconnect NI-700, that includes Manager and Subordinate interfaces. The Subordinate interfaces receive requests from Manager devices, such as coherent interconnect 110 and non-coherent agents 170, and the Manager interfaces send the requests to Subordinate devices, such as partitioned memory cache 160 and peripherals 180.

Figure 3:
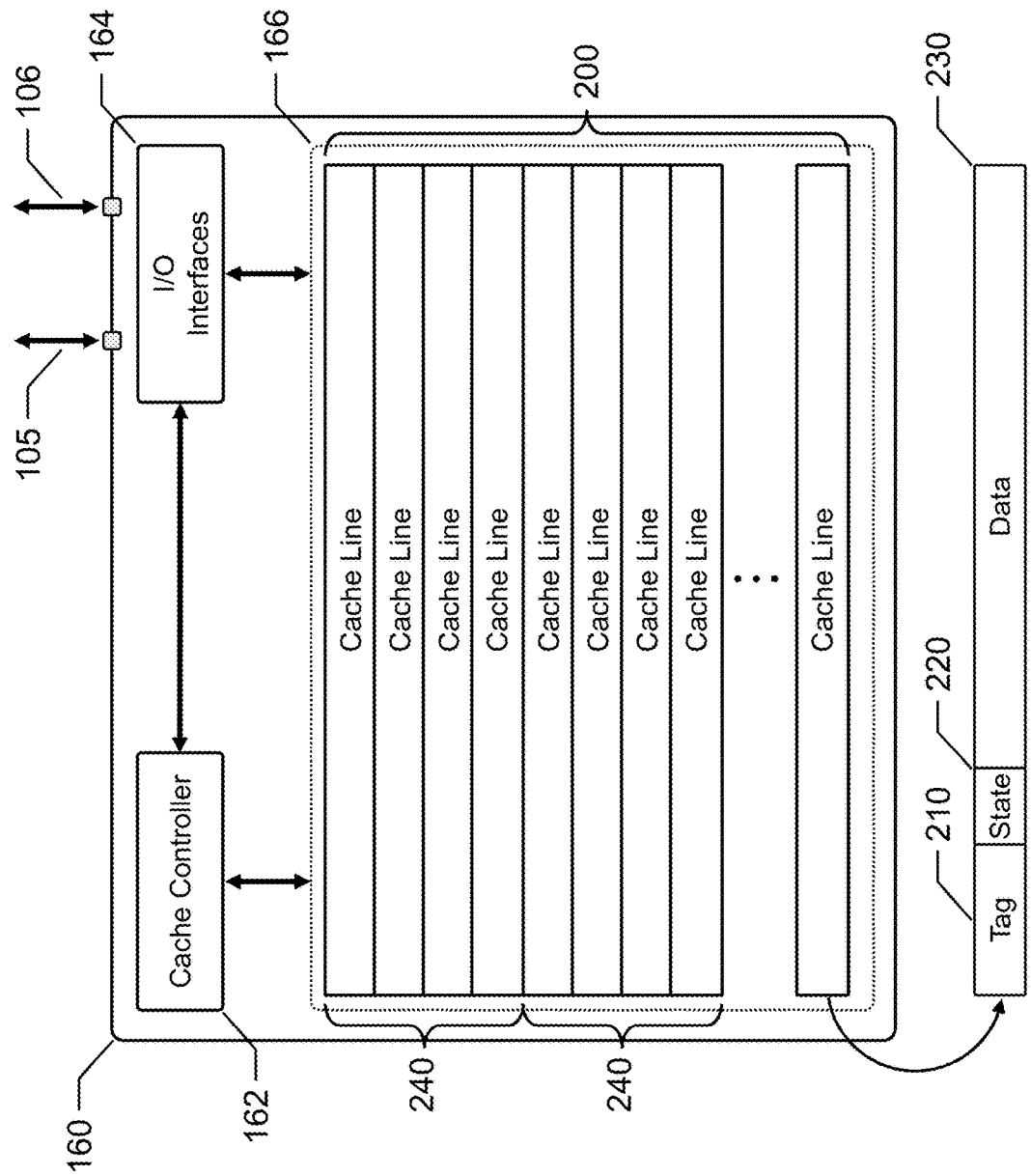
FIG. 3 depicts a partitioned memory cache, in accordance with an embodiment of the present disclosure.

FIG. 3 depicts partitioned memory cache 160, in accordance with an embodiment of the present disclosure.

Generally, partitioned memory cache 160 intercepts and processes requests intended for DMC complex 150 and memory 154, forwards the requests to DMC complex 150 as appropriate, and stores copies of the requested data for future use. In addition to identifying and storing shareable and non-shareable data from the coherent and non-coherent domains, respectively, partitioned memory cache 160 advantageously functions as an eviction cache for the coherent domain by caching shareable clean evictions, and enables the migration of dirty shareable cache lines back into the coherent domain without writing the cache line data to memory 154, as discussed in more detail below.

Partitioned memory cache 160 includes cache controller 162, I/O interfaces 164 and cache memory 166. Cache controller 162 is coupled to I/O interfaces 164 and cache memory 166, and I/O interfaces 164 are also coupled to cache memory 166. In various embodiments, partitioned memory cache 160 may be called a system cache, a last level cache (LLC), etc. Cache controller 162 includes a microprocessor, microcontroller, ASIC, FPGA, logic circuits, etc., and is configured to manage cache memory 166 and I/O interfaces 164, process incoming requests from CPU complex 120, GPU complex 130, I/O coherent agents 140 and non-coherent agents 170 (and send responses thereto), and send outgoing requests to DMC complex 150 (and process responses therefrom). Generally, these requests are read transactions and write transactions intended for DMC complex 150 and memory 154. Read and write transactions always include a memory address, and write transactions include the data to be written to memory 154.

I/O interfaces 164 include the appropriate circuitry to support the communication of these transactions over ACE5-Lite connection 105 and AXIS connection 106. As noted above, other communication protocols may also be used.

Cache memory 166 includes DRAM, embedded DRAM, SRAM, etc., and is configured to store a number of cache lines 200. Data are stored in cache lines 200 based on the transaction memory address and a cache mapping scheme. Generally, a cache line is a unit of data transfer between partitioned memory cache 160, DMC controller 150 and memory 154. Each cache line 200 includes tag field 210, state field 220 and data field 230. The size of each cache line 200 is typically indicted by the size of data field 230, such as, for example, 32 bytes, 64 bytes, etc. Tag field 210 stores a portion of the memory address at which the data is stored in memory 154 (i.e., a "tag"), state field 220 stores a number of bits that characterize the data, and data field 230 stores the data at that memory address. More particularly, data field 230 stores a sequence of bytes (e.g., 32 bytes, 64 bytes, etc.) beginning at that memory address. After a system start, restart, reset, etc., all of the cache lines 200 in cache memory 166 are cleared and available for allocation by cache controller 162.

In many embodiments, cache lines 200 are stored as a sequence of rows in cache memory 166. In other embodiments, each cache line is an architectural construct, and the fields of each cache line 200 are stored in a different portion of cache memory 166, i.e., tag fields 210 are stored in one portion of cache memory 166, state fields 220 are stored with tag fields 210 or in another portion of cache memory 166, data fields 230 are stored in a further portion of cache memory 166, and an indexing scheme may be used to link the cache line fields together. In these embodiments, the same type of memory may be used to store the cache line fields, or, alternatively, different types of memory may be used to store tag fields 210, state fields 220 and data fields 230. For example, tag fields 210 and state fields 220 may be stored in SRAM to increase performance during tag matching, while data fields 230 may be stored in eDRAM.

Generally, partitioned memory cache 160 may be a direct-mapped cache, an N-way set associative cache, or a fully-associative cache. A direct-mapped cache maps each memory address to a particular cache line 200; in other words, a direct-mapped cache maps multiple memory addresses to a singe cache line 200. An N-way set associative cache maps each memory address to a cache line within a particular set of N cache lines 200; in other words, an N-way set associative cache maps multiple memory addresses to each set of N cache lines 200. A fully-associative cache allows each memory address to be mapped to any cache line 200.

In one example, a direct-mapped cache has a capacity of 32 KB, a 32 B cache line size, and 1,024 cache lines 200 (i.e., 32 KB/32 bytes per cache line). In another example, a 4-way set associative cache has a capacity of 32 KB (i.e., total data storage), a 32 byte cache line size (i.e., data field size), and 4 cache lines (i.e., ways) per set. This 4-way set associative cache example has 256 sets 240 of 4 cache lines 200 (i.e., 32 KB/(4·32 B)=256 sets). In a further example, a fully-associated cache has a capacity of 32 KB, a 32 B cache line size, and 1,024 cache lines 200 (i.e., 32 KB/32 bytes per cache line).

Figure 4:
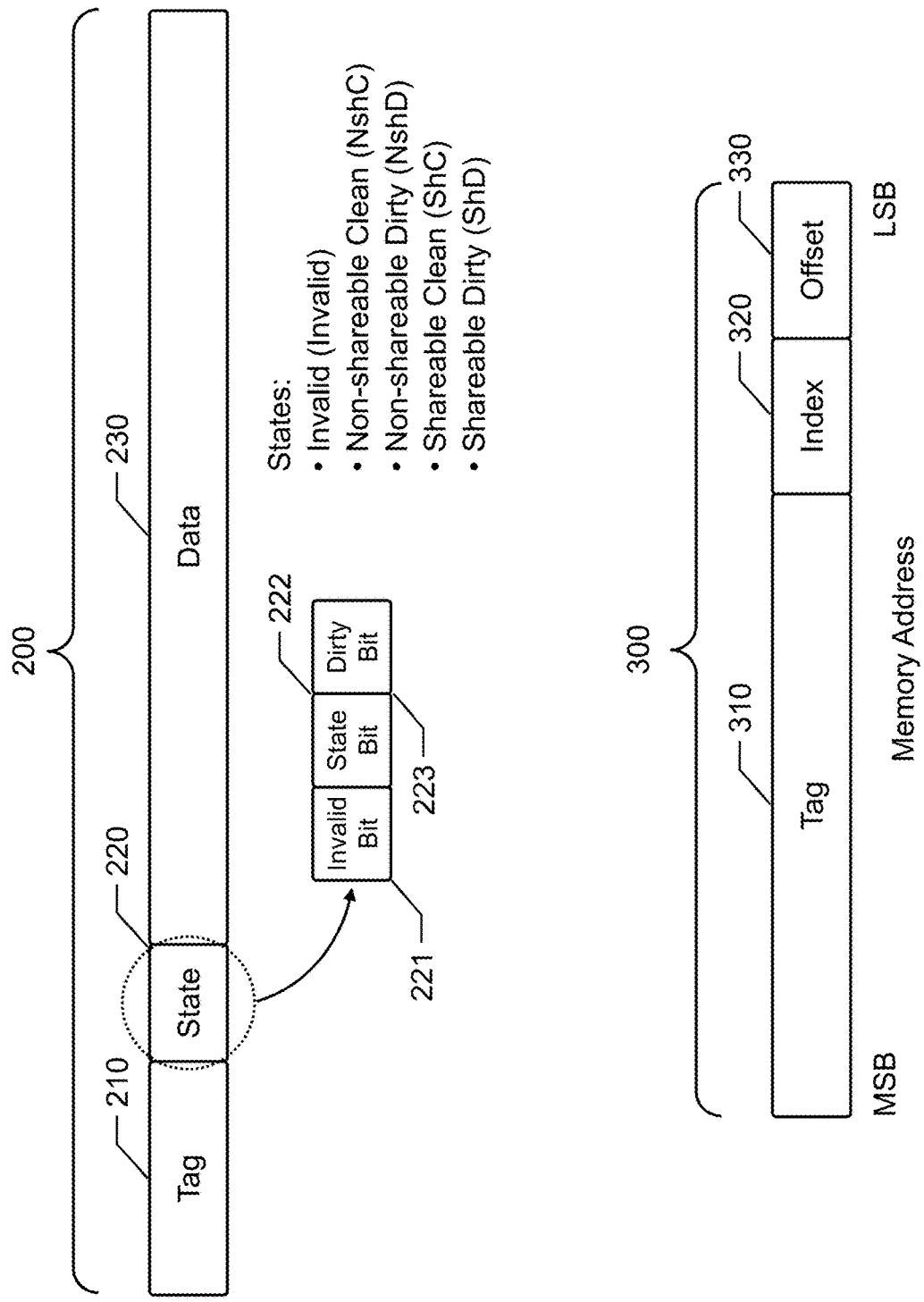
FIG. 4 depicts a cache line and a parsed memory address, in accordance with an embodiment of the present disclosure.

FIG. 4 depicts cache line 200 and parsed memory address 300, in accordance with an embodiment of the present disclosure.

State field 220 includes invalid bit 221 that indicates whether invalid or valid data is stored in cache line 200, state bit 222 that indicates whether shareable or non-shareable data is stored in cache line 200, and dirty bit 223 that indicates whether dirty or clean data is stored in cache line 200. For example, cache controller 162 may set invalid bit 221 to 1 to indicate invalid data and 0 to indicate valid data (or vice-versa), and may set dirty bit 223 to 1 to indicate dirty data and 0 to indicate clean data (or vice-versa). A source located in the coherent domain stores shareable data in partitioned memory cache 160, and a source located in the non-coherent domain stores non-shareable data in partitioned memory cache 160, so cache controller 162 sets state bit 222 based on the location of the source. Cache controller 162 may set state bit 222 to 1 to indicate shareable data and to 0 to indicate non-shareable data (or vice-versa).

Generally, state field 220 defines the state of cache line 200, and cache controller 162 sets or determines the state of cache line 200 based on the values of invalid bit 221, state bit 222 and dirty bit 223. In many embodiments, cache line 200 may have a number of different states, including invalid (e.g., state "Invalid"), non-shareable clean (e.g., state "NshC"), non-shareable dirty (e.g., state "NshD"), shareable clean (e.g., state "ShC"), and shareable dirty (e.g., state "ShD"). For example, cache controller 162 sets or determines a particular cache line 200 has the state Invalid when invalid bit 221 is set to 1 (regardless of the values of state bit 222 and dirty bit 223), the state NshC when invalid bit 221 is set to 0, state bit 222 is set to 0 and dirty bit 223 is set to 0, the state NshD when invalid bit 221 is set to 0, state bit 222 is set to 0 and dirty bit 223 is set to 1, the state ShC when invalid bit 221 is set to 0, state bit 222 is set to 1 and dirty bit 223 is set to 0, and the state ShD when invalid bit 221 is set to 0, state bit 222 is set to 1 and dirty bit 223 is set to 1.

After a transaction is received at partitioned memory cache 160 from a source within the coherent or the non-coherent domain, cache controller 162 determines whether the memory address of the transaction is stored in one of the cache lines 200. If the memory address and associated data are stored in one of the cache lines 200, the transaction is processed. If the memory address and associated data are not stored in one of the cache lines 200, a cache line is allocated to the transaction, and then the transaction is processed.

Cache controller 162 determines which cache line 200 may store the transaction data by parsing the transaction memory address and applying the cache mapping scheme.

For a direct-mapped cache, memory address 300 may be parsed into tag 310, index 320 and offset 330. Tag 310 is the portion of memory address 300 that is stored in tag field 210 of cache line 200. For a direct-mapped cache, index 320 identifies the specific cache line 200 in which the transaction data may be stored. Offset 330 identifies the byte within data field 230 of cache line 200.

For an N-way set associative cache, memory address 300 may be parsed into tag 310, index 320 and offset 330. Tag 310 is the portion of memory address 300 that is stored in tag field 210 of cache line 200. For an N-way set associative cache, index 320 identifies the specific set 240 of cache lines 200 in which the transaction data may be stored. Offset 330 identifies the byte within data field 230 of cache line 200.

For a fully-associative cache, memory address 300 may be parsed into tag 310 and offset 330; index 320 is not used because all of the cache lines 200 are available for allocation. Offset 330 identifies the byte within data field 230 of cache line 200.

In many embodiments, system 100 has a 32-bit physical memory address space (i.e., $2^{32}$ physical memory addresses), and each 32-bit memory address identifies a byte stored in memory 154.

In the direct-mapped cache example, 5 bits of the memory address identify the byte within data field 230 (i.e., $\log_2(32)$=5 bits) and 10 bits of the memory address identify the cache line 200 (i.e., $\log_2(1024)$=10 bits), so the size of tag field 210 is 17 bits (i.e., 32−10−5=17 bits) and each tag field 210 stores the 17 most significant bits (MSBs) of the memory address. In this example, the size of tag 310 is 17 bits, the size of index 320 is 10 bits, and the size of offset 330 is 5 bits.

In the 4-way set associative cache example, 5 bits of the memory address identify the byte within data field 230 (i.e., $\log_2(32)$=5 bits) and 8 bits of the memory address identify the set (i.e., $\log_2(256)$=8 bits), so the size of tag field 210 is 19 bits (i.e., 32−8−5=19 bits) and each tag field 210 stores the 19 most significant bits (MSBs) of the memory address. In this example, the size of tag 310 is 19 bits, the size of index 320 is 8 bits, and the size of offset 330 is 5 bits.

In the fully-associative cache example, 5 bits of the memory address identify the byte within data field 230 (i.e., $\log_2(32)$=5 bits), so the size of tag field 210 is 27 bits (i.e., 32−5=27 bits) and each tag field 210 stores the 27 most significant bits (MSBs) of the memory address. In this example, the size of tag 310 is 27 bits, and the size of offset 330 is 5 bits.

In other words, cache controller 162 determines tag 310 based on the transaction memory address for all three types of cache mapping schemes.

For a direct-mapped cache, cache controller 162 also determines index 320 based on the transaction memory address, identifies the cache line 200 in which the transaction data may be stored based on index 320, and then compares the tag stored in tag field 210 in the identified cache line 200 to tag 310. When cache controller 162 determines that tag 310 matches the tag stored in tag field 210, then the transaction is processed based on state field 220. A cache "hit" results when invalid bit 221 is set to valid (e.g., 0) and a cache "miss" results when invalid bit 221 is set to invalid (e.g., 1). When cache controller 162 determines that tag 310 does not match the tag stored in tag field 210 (i.e., a cache "miss"), the identified cache line 200 is allocated to the transaction, and then the transaction is processed. If valid data are stored within the allocated cache line 200, the data within allocated cache line 200 may be evicted from cache memory 166, depending on the transaction.

For an N-way set associative cache, cache controller 162 determines index 320 based on the transaction memory address, identifies the set 240 in which the transaction data may be stored based on index 320, and then searches the cache lines 200 of the identified set 240 for a tag stored in tag fields 210 that matches tag 310. When cache controller 162 determines that a particular cache line 200 in the identified set 240 has a tag stored in tag field 210 that matches tag 310, then the transaction is processed based on state field 220. A cache "hit" results when invalid bit 221 is set to valid (e.g., 0) and a cache "miss" results when invalid bit 221 is set to invalid (e.g., 1). When cache controller 162 determines that none of the cache lines 200 within the identified set 240 has a tag stored in tag field 210 that matches tag 310 (i.e., a cache "miss"), a cache line 200 within the identified set 240 is allocated to the transaction, and then the transaction is processed. If valid data are stored within the allocated cache line 200, the data within allocated cache line 200 may be evicted from cache memory 166, depending on the transaction.

In the fully-associative cache example, cache controller 162 searches all of the cache lines 200 for a tag stored in tag field 210 that matches tag 310. When cache controller 162 determines that a particular cache line 200 has a tag 310 that matches the tag stored in tag field 210, then the transaction is processed based on state field 220. A cache "hit" results when invalid bit 221 is set to valid (e.g., 0) and a cache "miss" results when invalid bit 221 is set to invalid (e.g., 1). When cache controller 162 determines that none of the cache lines 200 has a tag 310 that matches the tag stored in tag field 210 (i.e., a cache "miss"), a cache line 200 is allocated to the transaction, and then the transaction is processed. If valid data are stored within the allocated cache line 200, the data within allocated cache line 200 may be evicted from cache memory 166, depending on the transaction.

In other words, cache controller 162 searches one or more cache lines 200 for a tag stored in tag field 210 that matches tag 310 for all three types of cache mapping schemes.

More particularly, when cache controller 162 determines that the memory address is not stored in a cache line 200, cache controller 162 allocates a cache line 200 to the transaction, which includes setting state bit 222 of the allocated cache line 200, based on the source location, to indicate whether shareable or non-shareable data is stored in the allocated cache line 200. Cache controller 162 also stores tag 310 in tag field 210 of the allocated cache line 200, and then processes the transaction.

When a cache line 200 is allocated for a transaction, cache controller 162 processes read and write transactions differently. As discussed above, partitioned memory cache 160 receives transactions from sources within both the coherent domain and the non-coherent domain via non-coherent interconnect 115 and connection 105.

For a read transaction, cache controller 162 sends the read transaction, including, inter alia, the memory address and related information, to DMC complex 150 via connection 106 for processing. The related information includes, for example, the length or exact number of data transfers in the read transaction, the size or the number of bytes in each data transfer, etc. DMC complex 150 queries memory 154, and returns the read data to partitioned memory cache 160 via connection 106. Cache controller 162 stores the read data in data field 230 of the allocated cache line 200, sets invalid bit 221 to indicate valid data, and sets dirty bit 223 to indicate clean data. Typically, the read data fills data field 230 of cache line 200. Cache controller 162 then sends a read transaction response, including the read data, to non-coherent interconnect 115 via connection 105 for transmission back to the source.

Write transactions include write-through transactions, and may include write-back transactions as well. For a write-through transaction, cache controller 162 stores the write data in cache memory 166 and sends the write data to DMC complex 150 and memory 154 contemporaneously. For a write-back transaction, cache controller 162 initially stores the write data in cache memory 166, and after a delay, sends the write data to DMC complex 150 and memory 154. For example, cache controller 162 may delay sending the write data to DMC complex 150 and memory 154 until the cache line 200 in which the write data is stored is evicted from cache memory 166.

For a write-through transaction, cache controller 162 stores the write data in data field 230 of the allocated cache line 200, sets invalid bit 221 to indicate valid data, and sets dirty bit 223 to indicate clean data. Generally, the write data may fill data field 230 of cache line 200. Cache controller 162 then sends the write-through transaction, including, inter alia, the memory address, write data and related information, to DMC complex 150 via connection 106 for processing. The related information includes, for example, the length or exact number of data transfers in the write transaction, the size or the number of bytes in each data transfer, etc. DMC complex 150 sends the write-through transaction to memory 154, and then sends a write-through transaction response to partitioned memory cache 160 via connection 106. Cache controller 162 then sends a write-through transaction response to non-coherent interconnect 115 for transmission back to the source.

For a write-back transaction, cache controller 162 stores the write data in data field 230 of the allocated cache line 200, sets invalid bit 221 to indicate valid data, and sets dirty bit 223 to indicate dirty data because the data stored in cache memory 166 is different than the data stored in memory 154 for this memory address. Generally, the write data may fill data field 230 of cache line 200. After a delay, cache controller 162 changes dirty bit 223 to indicate clean data, and then sends the write-through transaction, including, inter alia, the memory address, write data and related information, to DMC complex 150 via connection 106 for processing. The related information includes, for example, the length or exact number of data transfers in the write transaction, the size or the number of bytes in each data transfer, etc. DMC complex 150 sends the write-back transaction to memory 154, and the sends a write-back transaction response to partitioned memory cache 160 via connection 106. Cache controller 162 then sends a write-back transaction response to non-coherent interconnect 115 for transmission back to the source.

When cache controller 162 determines that the memory address is stored in a cache line 200 (i.e., the identified cache line 200), cache controller 162 determines the state of cache line 200 based on state field 220. Further processing of the transaction depends upon the state of the identified cache line 200, as indicated by the values of invalid bit 221, state bit 222 and dirty bit 223, as well as the source location. As described above, in many embodiments, each cache line 200 in cache memory 166 may have an Invalid state (i.e., when the invalid bit indicates invalid data), an NshC state (i.e., when the invalid bit indicates valid data, the state bit indicates non-shareable data and the dirty bit indicates clean data), an NshD state (i.e., when the invalid bit indicates valid data, the state bit indicates non-shareable data and the dirty bit indicates dirty data), a ShC state (i.e., when the invalid bit indicates valid data, the state bit indicates shareable data and the dirty bit indicates clean data), or a ShD state (i.e., when the invalid bit indicates valid data, the state bit indicates shareable data and the dirty bit indicates dirty data).

When the state of the identified cache line 200 is the Invalid state and the source location is the coherent or non-coherent domain, cache controller 162 allocates the identified cache line 200 to the transaction, and then processes the transaction, as described above.

When the state of the identified cache line 200 is the NshC state, the NshD state, the ShC state or the ShD state and the source location is the coherent domain, the transaction is processed. In other words, a source within the coherent domain may "hit" on a shareable or non-shareable cache line 200.

When the state of the identified cache line 200 is the NshC state, the NshD state or the ShD state and the source location is the non-coherent domain, the transaction is processed. In other words, a source within the non-coherent domain may "hit" on a shareable and dirty cache line 200, but may not "hit" on a shareable and clean cache line 200. When the state of the identified cache line 200 is the ShD state, after the transaction is processed, cache controller 162 changes the state of the identified cache line 200 to the NshD state by setting state bit 222 to indicate non-shareable data.

When the transaction is a cache maintenance operation, the transaction is processed.

When the transaction is a write-through transaction or a write-back transaction that represents a clean eviction from a cache in the coherent domain, after the identified cache line 200 has been allocated to the transaction and state bit 222 set to indicate shareable data, cache controller 162 prevents the identified cache line 200 from being accessed by a source location within the non-coherent domain regardless of the value of dirty bit 223. In other words, a source within the non-coherent domain may not "hit" on a shareable and dirty cache line 200 that represents a clean eviction from the coherent domain.

When the transaction is a read transaction, the state of the identified cache line 200 is the ShD state and the source is located in the coherent domain, processing the transaction includes setting dirty bit 233 to indicate clean data but does not include writing the identified cache line 200 to the memory address.

In one embodiment, the interface to partitioned memory cache 160 is an ACE5-Lite interface, connection 105 is an ACE5-Lite connection, and connection 106 is an AXI5 connection. The following description places the advantageous features of partitioned memory cache 160 described above in the context of this embodiment.

A "Memory_Cache_Support" property may be used to indicate whether the interface supports partitioned memory cache 160. When set to "true", additional transactions for partitioned memory cache 160 are supported, and when set to "false", additional transactions for partitioned memory cache 160 are not supported. Table 1 presents compatibility between Manager and Subordinate interfaces, according to the values of the "Memory_Cache_Support" property.

TABLE 1

| Memory_Cache_Support | Subordinate: False | Subordinate: True |
|---|---|---|
| Manager: False | Compatible | Compatible |
| Manager: True | Incompatible | Compatible |

If a Manager supports partitioned memory cache transactions but a connected Subordinate does not, then alternative requests may be issued, as presented in Table 2.

TABLE 2

| Request | Alternative Request |
|---|---|
| WriteNoSnoopFull | WriteNoSnoop |
| WriteBackFull | WriteUniqueFull or WriteNoSnoop |
| WriteEvictFull | — |
| ReadShared or ReadClean | ReadOnce or ReadNoSnoop |

Transactions on the read channels may include a ReadClean transaction and a ReadShared transaction.

A ReadClean transaction is a full cache line shareable read where the data is likely to be allocated in an upstream cache, the transaction must be cache line sized and regular, and the read data must be clean.

A ReadShared transaction is a full cache line shareable read where the data is likely to be allocated in an upstream cache, the transaction must be cache line sized and regular, and the read data can be clean or dirty. If the data is dirty, the cache line must be allocated upstream and the response for all beats of read data must be OKAYDIRTY instead of OKAY.

Transactions on the write channels may include a WriteNoSnoopFull transaction, a WriteBackFull transaction and a WriteEvictFull transaction.

A WriteNoSnoopFull transaction is a non-shareable write of a full cache line where the data is dirty and not allocated upstream. The write must be cache line sized and regular. All write strobes must be asserted. An upstream cache can issue a WriteNoSnoopFull transaction when it evicts a non-shareable dirty cache line or when streaming write data which is cache line sized. If a downstream cache receives a WriteNoSnoopFull request, it can allocate the cache line knowing that the cache line is not allocated upstream and that a full cache line will be received, without any missing bytes.

A WriteBackFull transaction may be used when a shareable dirty cache line is evicted from a cache. This transaction enables partitioned memory cache 160 to allocate the cache line as shareable dirty. The write must be cache line sized and regular. All write strobes must be asserted.

A WriteEvictFull transaction may be used when a shareable clean cache line is evicted from a cache. This transaction enables a downstream cache to allocate the cache line as shareable clean. The write must be cache line sized and regular. All write strobes must be asserted. A shareable clean cache line must not be exposed to any non-shareable sources or agents because the cache line might become stale within a cache in the coherent domain. For the same reason, data from a WriteEvictFull transaction must not update memory 154.

With respect to read signaling, Table 3 presents several allowable operations. ReadShared and ReadClean also require the "Shareable_Transactions" parameter to be True.

TABLE 3

| ARSNOOP | Operation | ARDOMAIN | Restrictions |
| --- | --- | --- | --- |
| 0b0001 | ReadShared | ISH, OSH | Cache line sized, regular |
| 0b0010 | ReadClean | ISH, OSH | Cache line sized, regular |

When the Memory_Cache_Support property is true, RRESP includes the OKAYDIRTY response, as depicted in Table 4.

TABLE 4

| RRESP[2:0] | Response | Meaning |
| --- | --- | --- |
| 0b110 | OKAYDIRTY | Data is valid and is dirty with respect to the value in memory, only permitted for a response to a ReadShared transaction |

With respect to write signaling, Table 5 presents several allowable operations. WriteBackFull and WriteEvictFull transactions also require the Shareable_Transactions parameter to be true.

TABLE 5

| ARSNOOP | Operation | ARDOMAIN | Restrictions |
| --- | --- | --- | --- |
| 0b0001 | WriteNoSnoopFull | NSH | Cache line sized, regular |
| 0b0011 | WriteBackFull | ISH, OSH | Cache line sized, regular |
| 0b0101 | WriteEvictFull | ISH, OSH | Cache line sized, regular |

FIG. 5A depicts permitted cache state transitions table 400, in accordance with an embodiment of the present disclosure. Table 400 shows permitted state transitions which can occur without an ingress transaction that hits on a cache line.

FIGS. 5B to 5E depict expected and permitted state changes table 410, in accordance with embodiments of the present disclosure. Table 410 shows expected and permitted state changes in response to an ingress transaction.

Figure 6:
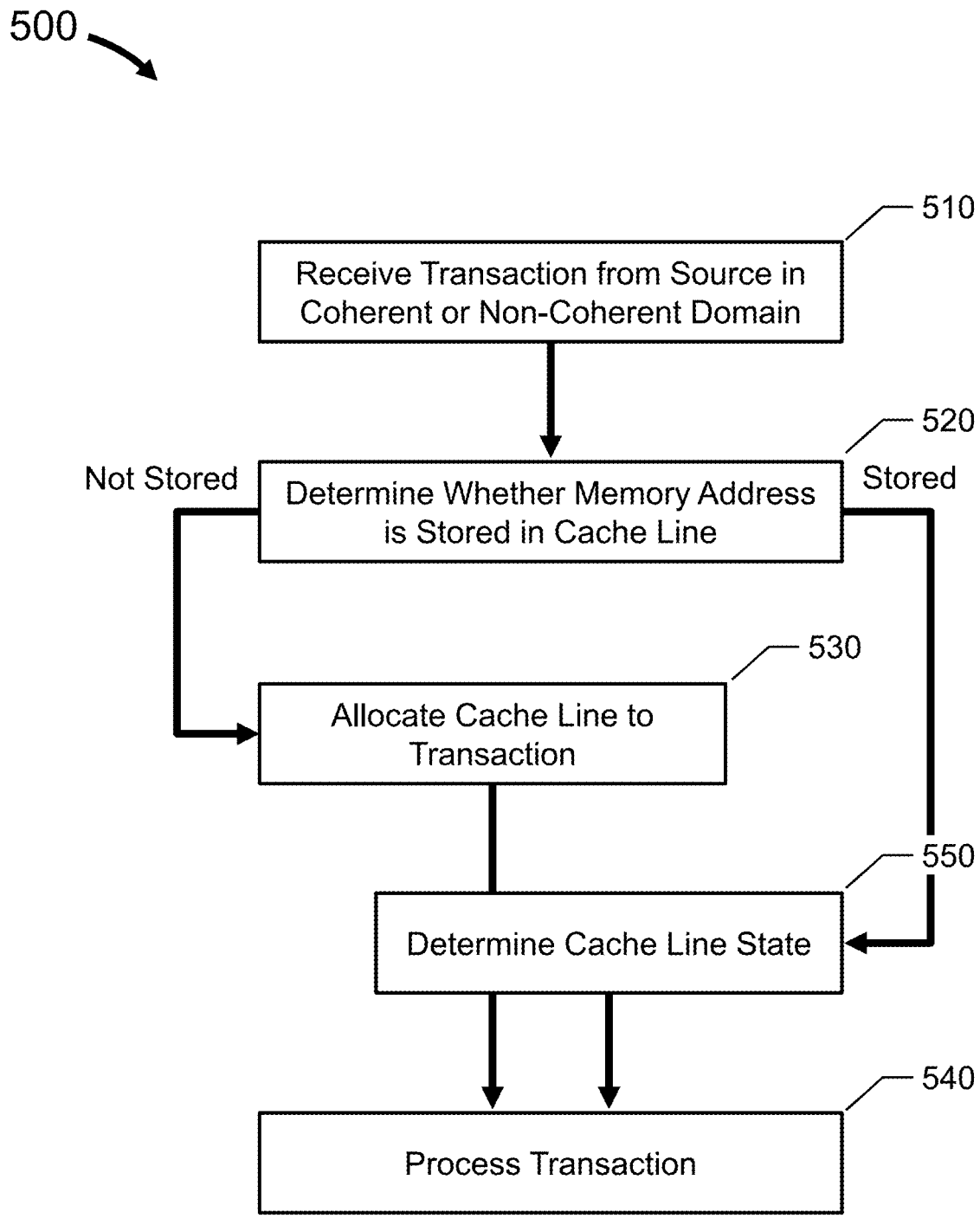
FIG. 6 depicts a flow diagram representing functionality associated with storing coherent data and non-coherent data in a system cache, in accordance with an embodiment of the present disclosure.

FIG. 6 depicts a flow diagram 500 representing functionality associated with storing coherent data and non-coherent data in a system cache, in accordance with embodiments of the present disclosure.

At 510, a transaction is received at partitioned memory cache 160 from a source in system 100. The transaction includes at least a memory address. The source has a location in a coherent domain or a non-coherent domain of system 100, the coherent domain includes shareable data and the non-coherent domain includes non-shareable data.

At 520, whether the memory address is stored in a cache line is determined. When the memory address is not determined to be stored on a cache line, flow proceeds to 530, and, when the memory address is determined to be stored on a cache line, flow proceeds to 550.

At 530, a cache line is allocated to the transaction, including setting a state bit of the allocated cache line, based on the source location, to indicate whether shareable or non-shareable data is stored in the allocated cache line. Flow then proceeds to 540.

At 540, the transaction is processed.

At 550, a state of the cache line is determined based on a state bit, an invalid bit and a dirty bit, the state including an invalid state, a non-shareable clean state, a non-shareable dirty state, a shareable clean state and a shareable dirty state. The invalid bit indicates whether invalid or valid data is stored in the cache line, and the dirty bit indicates whether dirty or clean data is stored in the cache line. Flow then proceeds to 540, where the transaction is processed based on the state of the cache line and the source location.

The embodiments described herein are combinable.

In one embodiment, a method for storing coherent data and non-coherent data in a system cache includes receiving a transaction from a source in a system, the transaction including at least a memory address, the source having a location in a coherent domain or a non-coherent domain of the system, the coherent domain including shareable data and the non-coherent domain including non-shareable data; determining whether the memory address is stored in a cache line; and when the memory address is not determined to be stored in a cache line: allocating a cache line to the transaction, including setting a state bit of the allocated cache line, based on the source location, to indicate whether shareable or non-shareable data is stored in the allocated cache line, and processing the transaction.

In another embodiment of the method, determining whether the memory address is stored in a cache line includes determining a tag based on the memory address, and searching one or more cache lines for a matching tag; and allocating the cache line to the transaction includes storing the tag in the cache line.

In another embodiment of the method, when the transaction is a read transaction, allocating the cache line includes sending a read request to a memory controller, receiving a read response, including read data, from the memory controller, and storing the read data in the cache line; and when the transaction is a write transaction including write data, allocating the cache line includes storing the write data in the cache line.

In another embodiment of the method, allocating a cache line to the transaction includes setting an invalid bit of the cache line to indicate whether invalid or valid data is stored in the cache line, and setting a dirty bit of the cache line to indicate whether dirty or clean data is stored in the cache line.

In another embodiment of the method, the method further includes, when the memory address is determined to be stored in a cache line determining a state of the cache line based on the state bit, the invalid bit and the dirty bit, the state including an invalid state, a non-shareable clean state, a non-shareable dirty state, a shareable clean state and a shareable dirty state; and processing the transaction based on the state of the cache line and the source location.

In another embodiment of the method, the invalid state is determined when the invalid bit indicates invalid data; the non-shareable clean state is determined when the invalid bit indicates valid data, the state bit indicates non-shareable data and the dirty bit indicates clean data; the non-shareable dirty state is determined when the invalid bit indicates valid data, the state bit indicates non-shareable data and the dirty bit indicates dirty data; the shareable clean state is determined when the invalid bit indicates valid data, the state bit indicates shareable data and the dirty bit indicates clean data; and the shareable dirty state is determined when the invalid bit indicates valid data, the state bit indicates shareable data and the dirty bit indicates dirty data.

In another embodiment of the method, processing the transaction includes when the source location is the coherent domain, the transaction is processed when the state of the cache line is the non-shareable clean state, the non-shareable dirty state, the shareable clean state or the shareable dirty state.

In another embodiment of the method, processing the transaction includes when the source location is the non-coherent domain, the transaction is processed when the state of the cache line is the non-shareable clean state, the non-shareable dirty state or the shareable dirty state.

In another embodiment of the method, when the state of the cache line is the shareable dirty state after the transaction is processed, changing the state of the cache line to the non-shareable dirty state.

In another embodiment of the method, the transaction is a cache maintenance operation, and the method further includes, when the memory address is determined to be stored in a cache line, processing the transaction.

In another embodiment of the method, the transaction is a clean eviction from the coherent domain, and, after the cache line has been allocated to the transaction and the state bit set to indicate shareable data, the cache line is not visible to a source having a location within the non-coherent domain.

In another embodiment of the method, the transaction is a read transaction from a source having a location in the coherent domain, the state bit indicates shareable data, the dirty bit indicates dirty data, and said processing the transaction includes setting the dirty bit to indicate clean data and not writing the cache line to the memory address.

In one embodiment, a system cache includes a communications interface configured to receive a transaction from a source in a system, the transaction including at least a memory address, the source having a location in a coherent domain or a non-coherent domain of the system, the coherent domain including shareable data and the non-coherent domain including non-shareable data; a memory, coupled to the communications interface, including a plurality of cache lines, each cache line having a tag field, a state field and a data field, the state field including an invalid bit, a state bit and a dirty bit; a controller, coupled to the communications interface and the memory, configured to determine whether the memory address is stored in a cache line, and, when the memory address is not determined to be stored in a cache line, allocate a cache line to the transaction, including set the state bit of the allocated cache line, based on the source location, to indicate whether shareable or non-shareable data is stored in the allocated cache line, and process the transaction.

In another embodiment of the system, determine whether the memory address is stored in a cache line includes determine a tag based on the memory address, and search one or more cache lines for a matching tag; and allocate the cache line includes store the tag in the cache line, set the invalid bit of the cache line to indicate whether invalid or valid data is stored in the cache line, and set the dirty bit of the cache line to indicate whether dirty or clean data is stored in the cache line.

In another embodiment of the system, when the transaction is a read transaction, allocate the cache line includes send a read request to a memory controller; receive a read response, including read data, from the memory controller; and store the read data in the cache line; and, when the transaction is a write transaction including write data, allocate the cache line includes store the write data in the cache line.

In another embodiment of the system, the controller is configured to, when the memory address is determined to be stored in a cache line, determine a state of the cache line based on the state bit, the invalid bit and the dirty bit, the state including an invalid state, a non-shareable clean state, a non-shareable dirty state, a shareable clean state and a shareable dirty state; and process the transaction based on the state of the cache line and the source location. The invalid state is determined when the invalid bit indicates invalid data, the non-shareable clean state is determined when the invalid bit indicates valid data, the state bit indicates non-shareable data and the dirty bit indicates clean data, the non-shareable dirty state is determined when the invalid bit indicates valid data, the state bit indicates non-shareable data and the dirty bit indicates dirty data, the shareable clean state is determined when the invalid bit indicates valid data, the state bit indicates shareable data and the dirty bit indicates clean data, and the shareable dirty state is determined when the invalid bit indicates valid data, the state bit indicates shareable data, and the dirty bit indicates dirty data.

In another embodiment of the system, process the transaction includes when the source location is the coherent domain, the transaction is processed when the state of the cache line is the non-shareable clean state, the non-shareable dirty state, the shareable clean state or the shareable dirty state.

In another embodiment of the system, process the transaction includes when the source location is the non-coherent domain, the transaction is processed when the state of the cache line is the non-shareable clean state, the non-shareable dirty state or the shareable dirty state.

In another embodiment of the system, when the state of the cache line is the shareable dirty state after the transaction is processed, the controller is configured to change the state of the cache line to the non-shareable dirty state.

In another embodiment of the system, the transaction is a cache maintenance operation, and the controller is configured to, when the memory address is determined to be stored in a cache line, process the transaction.

In another embodiment of the system, the transaction is a write transaction representing a clean eviction from the coherent domain, and, after the cache line has been allocated to the write transaction and the state bit set to indicate shareable data, the controller is configured to prevent access to the cache line by a source having a location within the non-coherent domain.

In another embodiment of the system, the transaction is a read transaction from a source having a location in the coherent domain, the state bit indicates shareable data, the dirty bit indicates dirty data, and said process the transaction includes set the dirty bit to indicate clean data and not write the cache line to the memory address.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, the terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "many embodiment," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A method for storing coherent data and non-coherent data in a system cache, comprising:
   receiving a transaction from a source in a system, the transaction including at least a memory address, the source having a location in a coherent domain or a non-coherent domain of the system, the coherent domain including shareable data and the non-coherent domain including non-shareable data;
   determining whether the memory address is stored in a cache line; and
   when the memory address is not determined to be stored in a cache line:
      allocating a cache line to the transaction, including setting a state bit of the allocated cache line, based on the source location, to indicate whether shareable or non-shareable data is stored in the allocated cache line, and
      processing the transaction.

2. The method according to claim 1, where:
   said determining whether the memory address is stored in a cache line includes:
      determining a tag based on the memory address, and
      searching one or more cache lines for a matching tag; and
   said allocating the cache line to the transaction includes:
      storing the tag in the cache line.

3. The method according to claim 2, where:
   when the transaction is a read transaction, said allocating the cache line includes:
      sending a read request to a memory controller,
      receiving a read response, including read data, from the memory controller, and
      storing the read data in the cache line; and
   when the transaction is a write transaction including write data, said allocating the cache line includes:
      storing the write data in the cache line.

4. The method according to claim 1, where said allocating a cache line to the transaction includes setting an invalid bit of the cache line to indicate whether invalid or valid data is stored in the cache line, and setting a dirty bit of the cache line to indicate whether dirty or clean data is stored in the cache line.

5. The method according to claim 4, further comprising:
   when the memory address is determined to be stored in a cache line:
      determining a state of the cache line based on the state bit, the invalid bit and the dirty bit, the state including an invalid state, a non-shareable clean state, a non-shareable dirty state, a shareable clean state and a shareable dirty state; and
      processing the transaction based on the state of the cache line and the source location.

6. The method according to claim 5, where:
the invalid state is determined when the invalid bit indicates invalid data;
the non-shareable clean state is determined when the invalid bit indicates valid data, the state bit indicates non-shareable data and the dirty bit indicates clean data;
the non-shareable dirty state is determined when the invalid bit indicates valid data, the state bit indicates non-shareable data and the dirty bit indicates dirty data;
the shareable clean state is determined when the invalid bit indicates valid data, the state bit indicates shareable data and the dirty bit indicates clean data; and
the shareable dirty state is determined when the invalid bit indicates valid data, the state bit indicates shareable data and the dirty bit indicates dirty data.

7. The method according to claim 5, where said processing the transaction includes:
when the source location is the coherent domain, the transaction is processed when the state of the cache line is the non-shareable clean state, the non-shareable dirty state, the shareable clean state or the shareable dirty state.

8. The method according to claim 5, where said processing the transaction includes:
when the source location is the non-coherent domain, the transaction is processed when the state of the cache line is the non-shareable clean state, the non-shareable dirty state or the shareable dirty state.

9. The method according to claim 8, where, when the state of the cache line is the shareable dirty state:
after the transaction is processed, changing the state of the cache line to the non-shareable dirty state.

10. The method according to claim 1, where the transaction is a cache maintenance operation, and the method further comprises:
when the memory address is determined to be stored in a cache line:
processing the transaction.

11. The method according to claim 4, where the transaction is a clean eviction from the coherent domain, and, after the cache line has been allocated to the transaction and the state bit set to indicate shareable data, the cache line is not visible to a source having a location within the non-coherent domain.

12. The method according to claim 5, where the transaction is a read transaction from a source having a location in the coherent domain, the state bit indicates shareable data, the dirty bit indicates dirty data, and said processing the transaction includes setting the dirty bit to indicate clean data and not writing the cache line to the memory address.

13. A system cache, comprising:
a communications interface configured to receive a transaction from a source in a system, the transaction including at least a memory address, the source having a location in a coherent domain or a non-coherent domain of the system, the coherent domain including shareable data and the non-coherent domain including non-shareable data;
a memory, coupled to the communications interface, including a plurality of cache lines, each cache line having a tag field, a state field and a data field, the state field including an invalid bit, a state bit and a dirty bit;
a controller, coupled to the communications interface and the memory, configured to:
determine whether the memory address is stored in a cache line, and
when the memory address is not determined to be stored in a cache line:
allocate a cache line to the transaction, including set the state bit of the allocated cache line, based on the source location, to indicate whether shareable or non-shareable data is stored in the allocated cache line, and
process the transaction.

14. The system cache according to claim 13, where:
said determine whether the memory address is stored in a cache line includes:
determine a tag based on the memory address, and
search one or more cache lines for a matching tag; and
said allocate the cache line includes:
store the tag in the cache line,
set the invalid bit of the cache line to indicate whether invalid or valid data is stored in the cache line, and
set the dirty bit of the cache line to indicate whether dirty or clean data is stored in the cache line.

15. The system cache according to claim 14 where:
when the transaction is a read transaction, said allocate the cache line includes:
send a read request to a memory controller;
receive a read response, including read data, from the memory controller; and
store the read data in the cache line; and
when the transaction is a write transaction including write data, said allocate the cache line includes:
store the write data in the cache line.

16. The system cache according to claim 14, where the controller is configured to:
when the memory address is determined to be stored in a cache line:
determine a state of the cache line based on the state bit, the invalid bit and the dirty bit, the state including an invalid state, a non-shareable clean state, a non-shareable dirty state, a shareable clean state and a shareable dirty state, where:
the invalid state is determined when the invalid bit indicates invalid data,
the non-shareable clean state is determined when the invalid bit indicates valid data, the state bit indicates non-shareable data and the dirty bit indicates clean data,
the non-shareable dirty state is determined when the invalid bit indicates valid data, the state bit indicates non-shareable data and the dirty bit indicates dirty data,
the shareable clean state is determined when the invalid bit indicates valid data, the state bit indicates shareable data and the dirty bit indicates clean data, and
the shareable dirty state is determined when the invalid bit indicates valid data, the state bit indicates shareable data and the dirty bit indicates dirty data; and
process the transaction based on the state of the cache line and the source location.

17. The system cache according to claim 16, where said process the transaction includes:
when the source location is the coherent domain, the transaction is processed when the state of the cache line is the non-shareable clean state, the non-shareable dirty state, the shareable clean state or the shareable dirty state.

18. The system cache according to claim 16, where said process the transaction includes:

when the source location is the non-coherent domain, the transaction is processed when the state of the cache line is the non-shareable clean state, the non-shareable dirty state or the shareable dirty state.

19. The system cache according to claim 18, where, when the state of the cache line is the shareable dirty state:
after the transaction is processed, the controller is configured to change the state of the cache line to the non-shareable dirty state.

20. The system cache according to claim 13, where the transaction is a cache maintenance operation, and the controller is configured to:
when the memory address is determined to be stored in a cache line:
process the transaction.

21. The system cache according to claim 14, where the transaction is a write transaction representing a clean eviction from the coherent domain, and, after the cache line has been allocated to the write transaction and the state bit set to indicate shareable data, the controller is configured to prevent access to the cache line by a source having a location within the non-coherent domain.

22. The system cache according to claim 14, where the transaction is a read transaction from a source having a location in the coherent domain, the state bit indicates shareable data, the dirty bit indicates dirty data, and said process the transaction includes set the dirty bit to indicate clean data and not write the cache line to the memory address.

\* \* \* \* \*